United States Patent
Kim et al.

(10) Patent No.: US 8,135,225 B2
(45) Date of Patent: Mar. 13, 2012

(54) METHOD FOR CODING RGB COLOR SPACE SIGNAL

(75) Inventors: Yong-Hwan Kim, Kyunggi-do (KR); Ji-Ho Park, Seoul (KR); Byeong-Ho Choi, Kyunggi-do (KR); Je-Woo Kim, Kyunggi-do (KR); Joonki Paik, Seoul (KR)

(73) Assignee: Korea Electronics Technology Institute, Kyunggi-do (KR)

( * ) Notice: Subject to any disclaimer, the term of this patent is extended or adjusted under 35 U.S.C. 154(b) by 1041 days.

(21) Appl. No.: 11/767,242

(22) Filed: Jun. 22, 2007

(65) Prior Publication Data
US 2008/0298694 A1 Dec. 4, 2008

(30) Foreign Application Priority Data

Jun. 4, 2007 (KR) ........................ 10-2007-0054329

(51) Int. Cl.
*G06K 9/36* (2006.01)
(52) U.S. Cl. ...................................... 382/236; 382/166
(58) Field of Classification Search .................... 382/236
See application file for complete search history.

(56) References Cited

U.S. PATENT DOCUMENTS

| | | | |
|---|---|---|---|
| 6,285,790 B1 * | 9/2001 | Schwartz | 382/234 |
| 2002/0196848 A1 * | 12/2002 | Roman | 375/240.08 |
| 2005/0013363 A1 * | 1/2005 | Cho et al. | 375/240.12 |
| 2008/0095235 A1 * | 4/2008 | Hsiang | 375/240.13 |
| 2008/0260025 A1 * | 10/2008 | Wada | 375/240.03 |
| 2010/0195714 A1 * | 8/2010 | Park et al. | 375/240.02 |
| 2010/0202539 A1 * | 8/2010 | Kondo et al. | 375/240.16 |
| 2011/0002391 A1 * | 1/2011 | Uslubas et al. | 375/240.16 |

FOREIGN PATENT DOCUMENTS

KR 1020070029776 A 3/2007

OTHER PUBLICATIONS

The H.264/AVC advanced video coding standard: overview and introduction to the fidelity range extensions Gary J. Sullivan, Pankaj N. Topiwala, and Ajay Luthra, Proc. SPIE 5558, 454 (2004), DOI:10.1117/12.564457.*

* cited by examiner

*Primary Examiner* — Bhavesh Mehta
*Assistant Examiner* — Nirav G Patel
(74) *Attorney, Agent, or Firm* — Edell, Shapiro & Finnan, LLC

(57) ABSTRACT

A method for coding an RGB color space signal is disclosed. In accordance with the method, a base plane is encoded using an independent mode, and an enhanced plane is encoded by referring to the base plane without converting the RGB color space signal into YCbCr color space signal to reduce a redundancy between RGB planes and improve a compression ratio of an image.

9 Claims, 3 Drawing Sheets

METHOD FOR CODING RGB COLOR SPACE SIGNAL

CROSS REFERENCE TO RELATED APPLICATIONS

This application claims priority under 35 U.S.C.§119 to Application No. KR 10200754329 filed on Jun. 4, 2007, entitled "Method for Coding RGB Color Space Signal," the entire contents of which are hereby incorporated by reference.

BACKGROUND OF THE INVENTION

1. Field of the Invention

The present invention relates to a method for coding an RGB color space signal, and in particular, to a method for coding an RGB color space signal wherein a base plane is encoded using an independent mode, and one or more enhanced plane is encoded by referring to the base plane to reduce a redundancy between RGB planes, thereby improving a compression ratio of an image.

2. Description of the Related Art

Recently standardized H.264/AVC High 4:4:4 profile includes H.264/AVC High 4:4:4 profile COMMON mode and H.264/AVC High 4:4:4 profile INDEPENDENT mode.

The H.264/AVC High 4:4:4 profile COMMON mode is a mode wherein a Cb/Cr signal coding is modified to a Y signal coding in a conventional 4:2:0/4:2:2 format coding of H.264/AVC. That is, contrary to a YCbCr 4:2:0/4:2:2 format coding, a single macroblock has one common Intra/Inter prediction mode and a CodedBlockPattern(CBP) for a Y/Cb/Cr signal, a residual syntax having a format identical to the Y signal is repeated three times. A second and a third residual syntax in the macroblock is for Cb and Cr signals. In other words, the H.264/AVC High 4:4:4 profile COMMON mode is a method wherein an algorithm for coding the conventional Y signal is merely applied to the Cb and Cr signals without adding a new algorithm for coding a 4:4:4 format signal.

The H.264/AVC High 4:4:4 profile INDEPENDENT mode is a method wherein a monochrome coding, which is a conventional 4:0:0/4:2:2 format coding, is applied to each of the Y, Cb and Cr signals independently. Contrary to the COMMON mode, each of the Y, Cb and Cr signals has different macroblock modes and prediction modes in the INDEPENDENT mode. In addition, after a Y plane is coded, a Cb plane is coded, a Cr plane is coded last. The H.264/AVC High 4:4:4 profile INDEPENDENT mode is a method wherein a conventional 4:0:0 format coding algorithm is applied to the Cb and Cr signals without adding a new algorithm for coding a 4:4:4 format signal similar to the COMMON mode.

Contrary to the COMMON mode, because the Y/Cb/Cr signals are independently encoded in the H.264/AVC High 4:4:4 profile INDEPENDENT mode, each macroblock has an independent macroblock mode and intra/inter prediction modes. Therefore, a drawback of the H.264/AVC High 4:4:4 profile INDEPENDENT mode is that a number of bits for representing an information of the macroblock is increased although the H.264/AVC High 4:4:4 profile INDEPENDENT mode is optimal for reducing a residual data. While encoder/decoder may process the Y/Cb/Cr planes in parallel in the H.264/AVC High 4:4:4 profile INDEPENDENT mode, the H.264/AVC High 4:4:4 profile INDEPENDENT mode has a similar to or a slightly lower efficiency than the COMMON mode in view of a compression.

While an algorithm for encoding of an RGB signal in the H.264/AVC High 4:4:4 profile common mode and the H.264/AVC High 4:4:4 profile INDEPENDENT mode is simple because the RGB signal is coded independently, an algorithm for removing a signal redundancy existing in RGB planes is not included. Therefore, an efficiency of the coding is low.

A reason why the algorithm for removing the signal redundancy is not included is that an algorithm of a conventional video coding standard is developed by assuming only an YCbCr color space signal. An YCbCr color space is a color space wherein the signal redundancy of the RGB color space is mostly removed.

Therefore, the encoding of the RGB color space signal is carried out after transforming the RGB color space to the YCbCr color space, and a decoded YCbCr color space is transformed back to the RGB color space to be outputted to a display apparatus.

However, because the inter-transformation of the RGB color space to the YCbCr color space is a lossy transform, a critical problem occurs in a professional environment such as a digital cinema or a medical imaging aiming at a very high fidelity.

SUMMARY OF THE INVENTION

It is an object of the present invention to provide a method for coding an RGB color space signal wherein a base plane is encoded using an independent mode, and one or more enhanced plane is encoded by referring to the base plane without converting the RGB color space signal into YCbCr color space signal to reduce a redundancy between RGB planes, thereby improving a compression ratio of an image.

In order to achieve the above-described object, there is provided a method for encoding an RGB color space signal, comprising steps of: (a) encoding a base plane having a color_plane_id of a first value using an independent mode; and (b) encoding one or more enhanced plane having the color_plane_id of a second value by referring to the base plane.

It is preferable that the first value is zero and the second value is 1 or higher.

It is preferable that the one or more enhanced plane comprises a first enhanced plane and a second enhanced plane, and the step (b) comprises encoding the second enhanced plane by referring to the base plane and the first enhanced plane.

It is preferable that the step (b) comprises encoding a current macroblock by referring to a reference macroblock in an intra base plane macroblock mode.

It is preferable that an information on a use of the intra base plane macroblock mode is stored in at least one of a macroblock hierarchy, a slice information, a slice header, a slice extended information, a picture parameter set and a sequence parameter set.

It is preferable that the reference macroblock is a macroblock of the base plane.

It is preferable that the step (b) comprises: (b-1) encoding the current macroblock using an intra prediction mode of the base plane; and (b-2) encoding a difference between a residual information generated by encoding the current macroblock and a residual information generated by encoding the reference macroblock.

It is preferable that comprising subjecting the residual information generated by encoding the reference macroblock to a low pass filtering in a vertical direction, a horizontal direction or a DC direction.

It is preferable that the residual information generated by encoding the reference macroblock is an information generated by encoding the reference macroblock using the intra prediction mode in the base plane, and the residual information generated by encoding the current macroblock is an information generated by encoding the current macroblock using a mode identical to the intra prediction mode of the base plane when the current macroblock is a macroblock included in the one or more enhanced plane.

It is preferable that the step (b) comprises encoding a difference between a current macroblock of the enhanced plane and a reference macroblock of the base plane in an intra base plane macroblock mode.

It is preferable that a discrete cosine transform of the current macroblock is carried out in a manner that a block size of the discrete cosine transform of the current macroblock is same as that of the reference macroblock.

It is preferable that a reference macroblock is an inter macroblock in an inter base plane macroblock mode, and a current macroblock is encoded using a motion information of the reference macroblock.

It is preferable that the step (b) comprises: (b-1) encoding the current macroblock using a motion information of the base plane; and (b-2) encoding a difference between a residual information generated by encoding the current macroblock and a residual information generated by encoding the reference macroblock.

It is preferable that further comprising subjecting the residual information generated by encoding the reference macroblock to a low pass filtering in a vertical direction, a horizontal direction or a DC direction.

It is preferable that a reference macroblock is an inter macroblock in an inter base plane macroblock mode, and a current macroblock is encoded using a reference index of the reference macroblock and using a motion vector as a prediction value.

It is preferable that an information on a use of the inter base plane macroblock mode is stored in at least one of a macroblock hierarchy, a slice information, a slice header, a slice extended information, a picture parameter set and a sequence parameter set.

It is preferable that the step (b) comprises, in a combined macroblock mode,: (b-1) determining whether a mode of a reference macroblock of the base plane is an intra base plane macroblock mode or an inter base plane macroblock mode; (b-2) selecting one of the intra base plane macroblock mode and the inter base plane macroblock mode according to the mode of reference macroblock of the base plane; and (b-3) encoding a current macroblock of the enhanced plane according to the macroblock mode selected in the step (b-2).

It is preferable that an information on a use of the combined base plane macroblock mode is stored in at least one of a macroblock hierarchy, a slice information, a slice header, a slice extended information, a picture parameter set and a sequence parameter set.

It is preferable that further comprising (c) carrying out a filtering for a deblocking.

It is preferable that the step (c) comprises adjusting an intensity of the filtering according to a boundary of a reference macroblock of the base plane and a current macroblock of the enhanced plane in an intra base plane macroblock mode.

It is preferable that the step (c) comprises carrying out the filtering having a constant intensity.

It is preferable that a method for decoding an RGB color space signal, comprising steps of: (a) decoding a base plane having a color_plane_id of a first value using the independent mode; and (b) decoding one or more enhanced plane having the color_plane_id of a second value by referring to the base plane.

DETAILED DESCRIPTION OF THE INVENTION

The above-described objects and other objects and characteristics and advantages of the present invention will now be described in detail with reference to the accompanied drawings.

Figure 1:
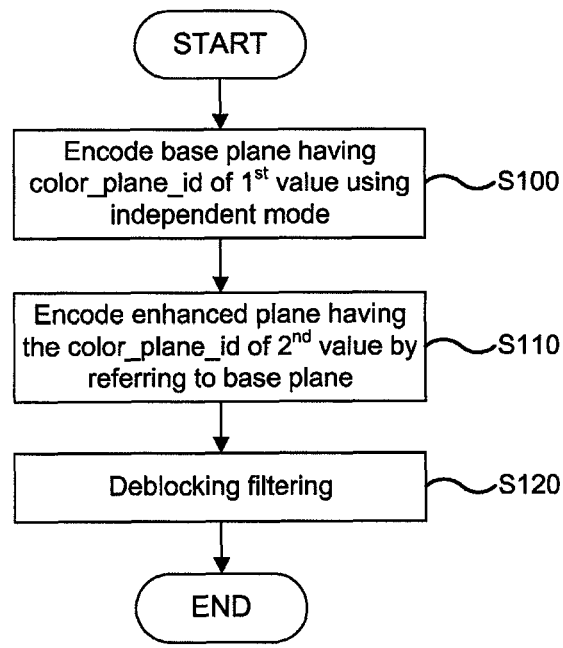
FIG. 1 is a flow diagram illustrating a method for encoding an RGB color space signal in accordance with the present invention.

FIG. 1 is a flow diagram illustrating a method for encoding an RGB color space signal in accordance with the present invention.

Referring to FIG. 1, a base plane (BP) having a color_plane_id of a color plane of a first value is encoded using an independent mode (S100).

color_plane_id is stored in a slice header. For instance, the color plane whose value of color_plane_id is zero is referred to as the base plane, and the base plane is encoded/decoded using the independent mode, i.e. conventional syntax.

Thereafter, one or more enhanced plane (EP) having the color_plane_id of a second value are encoded by referring to the base plane (S110). For instance, the color plane whose value of color_plane_id is 1 or higher is referred to as the enhanced plane, and the enhanced plane is encoded/decoded by referring to the base plane.

An example of the syntax according to the method for encoding the RGB color space signal of the present invention is shown in tables 1 through 3.

TABLE 1

| seq_parameter_set_rbsp( ){ | C | Descriptor |
|---|---|---|
| ...(identical to conventional H.264/AVC syntax) | ... | ... |
| if( profile_idc == 100 \|\| profile_idc == 110 \|\| profile_idc == 122 \|\| profile_idc == 144 \|\| profile_idc == 83 ) { | | |
|   chroma_format_idc | 0 | ue(v) |
|   if( chroma_format_idc == 3 ) { | | |
|     separate_color_plane_flag | 0 | u(1) |
|     if( sperate_color_plane_flag ) | | |
|     adaptive_interplane_residual_prediction | 0 | u(1) |
|   } | | |
|   bit_depth_luma_minus8 | 0 | ue(v) |
| ...(identical to conventional H.264/AVC syntax) | | |

TABLE 2

| slice_header( ){ | C | Descriptor |
|---|---|---|
|   first_mb_in_slice | 2 | ue(v) |
|   slice_type | 2 | ue(v) |
|   pic_parameter_set_id | 2 | ue(v) |
|   if( separate_color_plane_flag == 1 ) { | | |

TABLE 2-continued

| slice_header( ){ | C | Descriptor |
|---|---|---|
|     color_plane_id | 2 | u(2) |
|     base_plane_flag | 2 | u(1) |
|     if( IsLastPlaneFlag ) | | |
|       adaptive_base_plane_flag | 2 | u(1) |
|     } | | |
|     frame_num | 2 | u(v) |
| ...(identical to conventional H.264/AVC syntax) | | |

TABLE 3

| macroblock_layer( ){ | C | Descriptor |
|---|---|---|
|   if ( adaptive_interplane_residual_prediction && !IsBasePlane ) { | | |
|     airp_flag | 2 | u(1) |
|     if ( airp_flag && IsLastPlaneFlag ) | | |
|       flip_base_plane_flag | 2 | u(1) |
|   } | | |
|   else { | | |
|     mb_type | 2 | ue(v) \| ae(v) |
|   } | | |
|   if( mb_type == I_PCM ) { | | |
| ...(identical to conventional H.264/AVC syntax) | | |
|   } else { | | |
|     if( transform_8×8_mode_flag && mb_type == I_N×N && !airp_flag ) | | |
|       transform_size_8×8_flag | 2 | u(1) \| ae(v) |
|     if( !airp_flag ) | 2 | |
|       mb_pred( mb_type ) | 2 | |
|   } | | |
|   if( MbPartPredMode( MbPartPredMode( mb_type,0 ) != Intra_16×16 \|\| airp_flag ) { | | |
|     coded_block_pattern | 2 | me(v) \| ae(v) |
|     if( CodedBlockPatternLuma > 0 && transform_8×8_mode_flag && mb_type != I_N×N && noSubMbPartSizeLessThan8×8Flag && !airp_flag && ( mb_type != B_Direct_16×16 \|\| direct_8×8_inference_flag ) ) | | |
|       transform_size_8×8_flag | 2 | u(1) \| ae(v) |
|   } | | |
| ...(identical to conventional H.264/AVC syntax) | | |

Table 1 shows a sequence parameter set in accordance with the present invention, table 2 shows the slice header in accordance with the present invention, and table 3 shows a macroblock layer in accordance with the present invention.

A description of the syntax used in tables 1 through 3 is as follows.

BasePlaneId specifies the color_plane_id of base plane. The base plane can be selected by the following conditions.

1) base_plane_flag is equal to 1; or
2) if base_plane_flag is not present, color_space_id is equal to 0.

IsBasePlane

If one of following conditions is true, IsBasePlane is set to 1.

1) base_plane_flag is equal to 1; or
2) if base_plane_flag is not present, color_space_id is equal to 0.

Otherwise IsBasePlane is set to 0.

FirstEnhancedPlaneId specifies the color_plane_id of a first enhanced plane.

If color_plane_id of the current slice is not the same as BasePlaneId, color_plane_id of the current slice is FirstEnhancedPlaneId.

IsLastPlaneFlag specifies that whether the current plane is the last color plane or not.

If color_plane_id of the current slice is not equal to BasePlaneId and FirstEnahdncePlaneId, IsLastPlaneFlag is set to 1. Otherwise, IsLastPlaneFlag is set to 0.

adaptive_interplane_residual_prediction=1 specifies that an inter-plane residual prediction shall be applied to the color planes which are the enhanced planes.

adaptive_interplane_residual_prediction=0 specifies that the inter-plane residual prediction shall not be applied to all color planes.

adaptive_base_plane_flag=1 specifies that the first enhanced plane can be used as reference for the residual prediction of the second enhanced plane. Otherwise base plane is used as reference for residual prediction of all enhanced planes.

One of two methods may be used in order to determine whether the color plane is the base plane.

1) base_plane_flag indicates whether the current plane is the base plane or not. In this case there is no restriction for a plane order.

2) If base_plane_flag is not present and color_plane_id is equal to 0, a decoder considers the current slice contains a base plane information. In this case, the slice data of enhanced plane must be inputted after the slice data of the base plane information.

airp_flag equal to 1 indicates that mb_type for a current macroblock are inferred. The intra prediction modes, reference indices, and motion vectors shall be inferred in dependence of the corresponding base plane macroblock, if applicable. Otherwise mb_type is not inferred.

flip_base_plane_flag indicates that the reference plane of adaptive inter-plane residual prediction is flipped over. The candidates of reference plane for the last plane is either base plane or the first enhanced plane.

codded_block_pattern for macroblocks with mb_type equal to Intra_16×16 and airp_flag equal to 1 specifies one of following cases.

If codded_block_pattern equal to 0, one or more DC transform coefficient levels are non-zero valued, all AC transform coefficient levels are equal to 0.

If codded_block_pattern equal to 15, one or more DC and AC transform coefficient levels are non-zero valued.

Referring to FIG. 1, the one or more enhanced plane may be encoded by referring to other enhanced planes.

For instance, when the one or more enhanced plane includes a first enhanced plane and a second enhanced plane, the first enhanced plane may be encoded by referring to the base plane, and the second enhanced plane may be adaptively encoded by referring to the base plane and the first enhanced plane.

Thereafter, a deblocking filtering may be carried out (S120).

When an intra base plane macroblock mode (IntraBP mode) is used, a deblocking filter having a predetermined filtering intensity may be used. In particular, it is preferable that an intensity of the filtering is adjusted according to whether a boundary of a reference macroblock of the base plane and a current macroblock of the enhanced plane exists.

When an inter base plane macroblock mode (InterBP mode) is used, it is preferable that the filtering having a constant intensity is carried out.

The method for encoding the RGB color space signal in accordance with the present invention shown in FIG. 1 will be described in detail according to an encoding mode.

Figure 2:
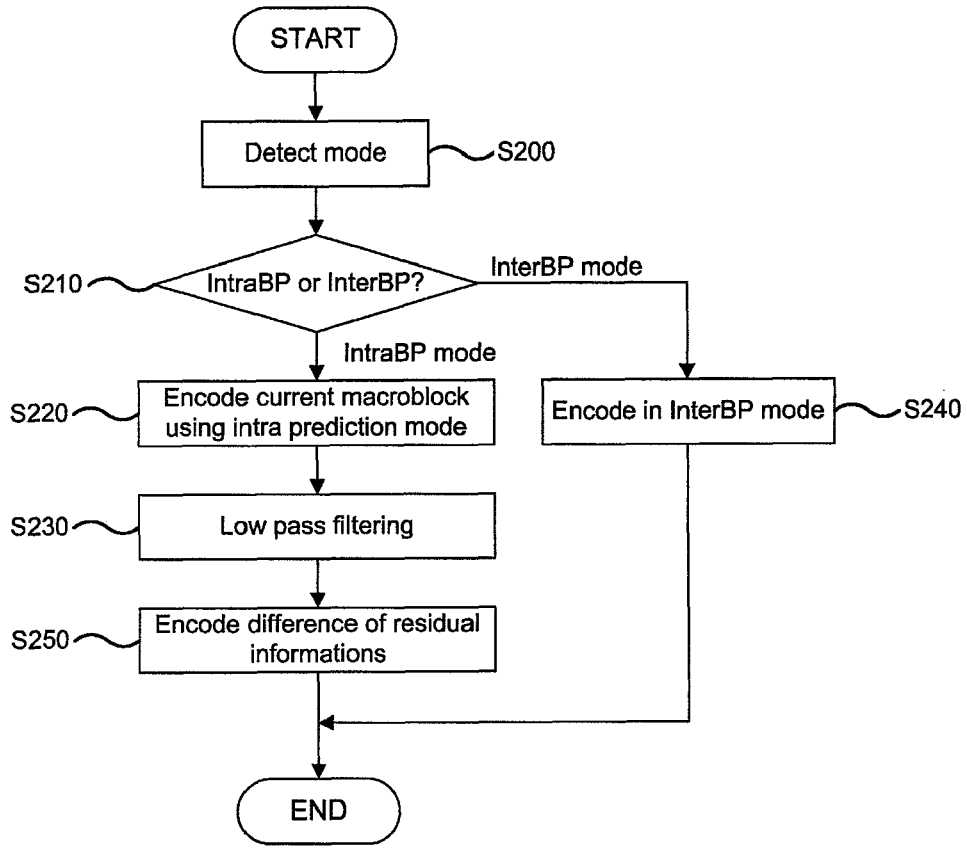
FIG. 2 is a flow diagram illustrating a method for encoding an enhanced plane when an IntraBP mode is selected in accordance with the present invention.

FIG. 2 is a flow diagram illustrating a method for encoding the enhanced plane when the IntraBP macroblock mode is selected in accordance with the present invention.

Referring to FIG. 2, a mode of the macroblock is detected (S200). The mode of the macroblock may be the IntraBP macroblock mode or the InterBP macroblock mode.

The IntraBP macroblock mode refers to referring to an intra macroblock of the base plane in a single frame, and the InterBP macroblock mode refers to referring to an inter macroblock of the base plane.

Thereafter, the current macroblock of the enhanced plane is encoded by referring to the reference macroblock of the base plane.

Specifically, when the mode of the macroblock is the IntraBP macroblock mode (S210), the current macroblock is encoded using an intra prediction mode of the base plane (S220). The current macroblock refers to the macroblock to be encoded or decoded, and the reference macroblock refers to the macroblock referred by the current macroblock, wherein a position of the reference macroblock is same as that of the current macroblock in the plane referred by the current macroblock.

It is preferable that the IntraBP macroblock mode used when the reference macroblock is intra-encoded.

Thereafter, a residual information generated by encoding the reference macroblock may be subjected to a low pass filtering in a vertical direction, a horizontal direction or a DC direction according to the macroblock mode and the intra mode (S230).

Thereafter, a difference between a residual information generated by encoding the current macroblock and the residual information generated by encoding the reference macroblock is encoded (S250).

That is, when one of the macroblocks in the enhanced plane is encoded using the IntraBP macroblock mode, informations generated in the corresponding macroblock includes 1) an information that the macroblock is encoded in the IntraBP macroblock mode, and 2) an information corresponding to a difference between an information generated by the intra prediction encoding in the base plane and an information generated by encoding using a mode same as the intra prediction encoding. When the current macroblock is a macroblock included in the enhanced plane, the residual information generated by encoding the reference macroblock is the information generated by encoding the reference macroblock using the intra prediction encoding in the base plane, and the residual information generated by encoding the current macroblock is the information generated by encoding the current macroblock using the mode same as the intra prediction encoding in the enhanced plane.

In such case, when a similarity exists between the base plane and the enhanced plane, a redundancy is removed by the encoding method of the IntraBP macroblock mode. Therefore, a high compression efficiency is achieved.

An information on whether to use the intra base plane macroblock mode is preferably stored in at least one of a macroblock hierarchy, a slice information, a slice header, a slice extended information, a picture parameter set and a sequence parameter set. Whether to use the IntraBP macroblock mode is determined by referring to the information when encoding/decoding.

In one embodiment, a difference between the current macroblock of the enhanced plane and the reference macroblock of the base plane may be encoded in the IntraBP macroblock mode.

In addition, it is preferable that a discrete cosine transform (DCT) of the current macroblock is carried out in a manner that a block size of the discrete cosine transform of the current macroblock is same as that of the reference macroblock.

When the InterBP macroblock mode is selected in the step S210, the enhanced plane is encoded using the InterBP macroblock mode, at step S240.

Figure 3:
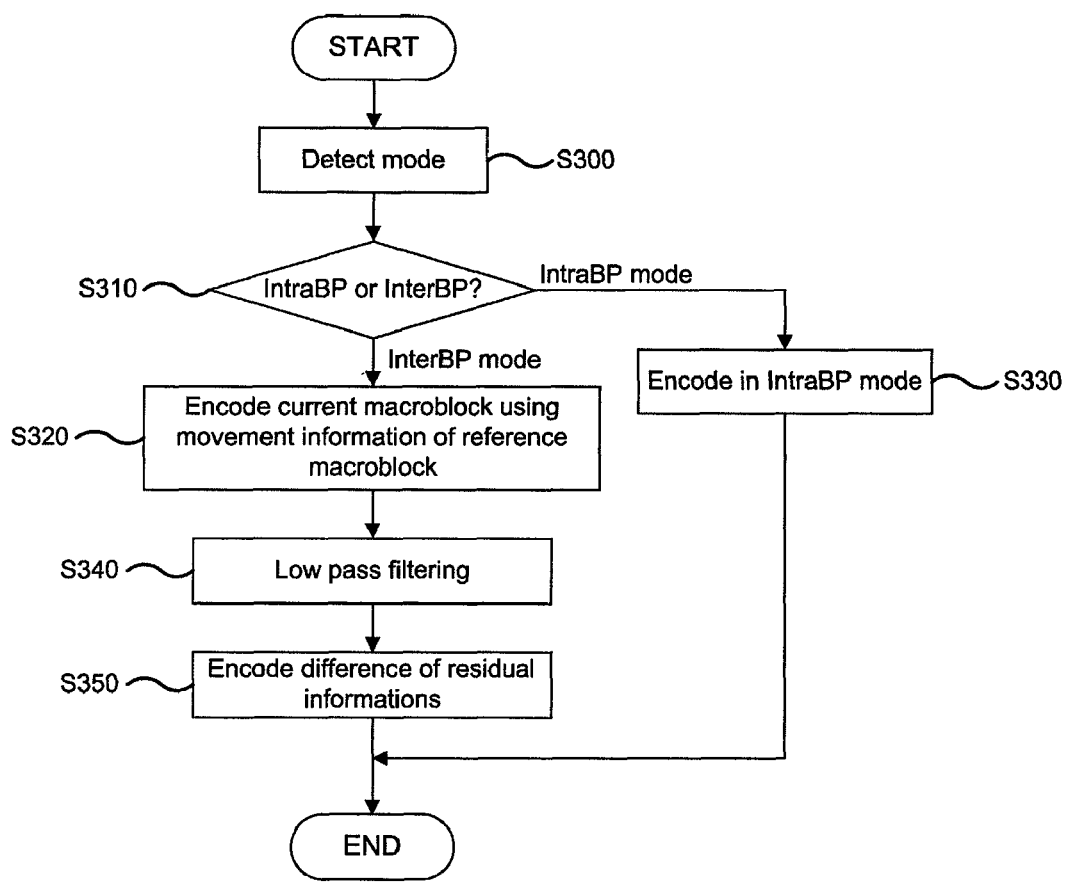
FIG. 3 is a flow diagram illustrating a method for encoding an enhanced plane when an InterBP mode is selected in accordance with the present invention.

FIG. 3 is a flow diagram illustrating a method for encoding the enhanced plane when the InterBP mode is selected in accordance with the present invention.

Referring to FIG. 3, the mode of the macroblock is detected (S300).

The current macroblock is encoded using a motion information of the reference macroblock (S320) when the mode of the macroblock is the InterBP macroblock mode (S310). The current macroblock is encoded in the IntraBP macroblock mode (S330) when the mode of the macroblock is the IntraBP macroblock mode (S310).

In order for the InterBP macroblock mode to be selected, the reference macroblock should be the inter macroblock. The motion information includes a reference index and a motion vector. The motion information may be used as is or as a prediction value. When motion information is used as is, the reference index and the motion vector may be used as is, and when motion information is used as the prediction value, the reference index may be used as is and the motion vector may be used as the prediction value.

Thereafter, the residual information generated by encoding the reference macroblock may be subjected to the low pass filtering in the vertical direction, the horizontal direction or the DC direction according to the macroblock mode and the intra mode (S340).

Thereafter, the difference between the residual information generated by encoding the current macroblock and the residual information generated by encoding the reference macroblock is encoded (S350).

That is, when one of the macroblocks in the enhanced plane is encoded using the InterBP macroblock mode, informations generated in the corresponding macroblock includes 1) an information that the macroblock is encoded in the InterBP macroblock mode, and 2) an information corresponding to a difference between an information generated by the inter prediction encoding in the base plane and an information generated by encoding using a mode same as the inter prediction encoding. When the current macroblock is a macroblock included in the enhanced plane, the residual information generated by encoding the reference macroblock is the information generated by encoding the reference macroblock using the inter prediction encoding in the base plane, and the residual information generated by encoding the current macroblock is the information generated by encoding the current macroblock using the mode same as the inter prediction encoding in the enhanced plane.

In such case, when the similarity exists between the base plane and the enhanced plane, the redundancy is removed by the encoding method of the InterBP macroblock mode. Therefore, a high compression efficiency is achieved.

In addition, it is preferable that the discrete cosine transform (DCT) of the current macroblock is carried out in a manner that the block size of the discrete cosine transform of the current macroblock is same as that of the reference macroblock.

An information on whether to use the InterBP macroblock mode is preferably stored in at least one of the macroblock hierarchy, the slice information, the slice header, the slice extended information, the picture parameter set and the sequence parameter set.

Figure 4:
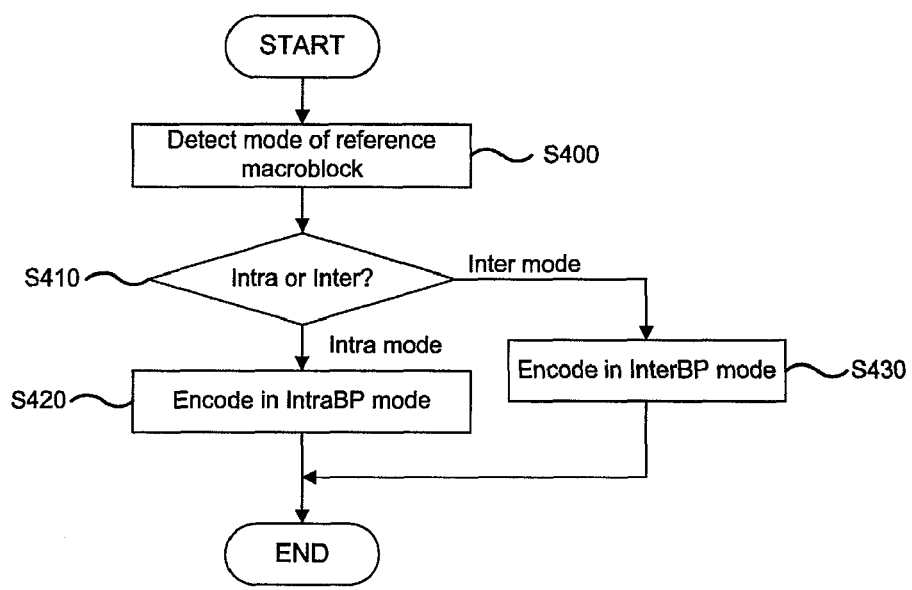
FIG. 4 is a flow diagram illustrating a method for encoding an enhanced plane when a combined mode is selected in accordance with the present invention.

FIG. 4 is a flow diagram illustrating a method for encoding the enhanced plane when a combined mode is selected in accordance with the present invention.

Referring to FIG. 4, the mode of the reference macroblock of the base plane is detected (S400). That is, whether the mode of the reference macroblock of the base plane is the IntraBP macroblock mode or the InterBP macroblock mode is determined.

When the mode of the reference macroblock is the IntraBP macroblock mode, the enhanced plane is encoded using the IntraBP macroblock mode (S420). When the mode of the reference macroblock is the InterBP macroblock mode, the enhanced plane is encoded using the InterBP macroblock mode (S430).

That is, whether the mode of the reference macroblock of the base plane is the IntraBP macroblock mode or the InterBP macroblock mode is determined, and the current macroblock of the enhanced plane is encoded by selecting one of the IntraBP macroblock mode and the InterBP macroblock mode according to the mode of reference macroblock of the base plane.

An information on whether to use the combined macroblock mode is preferably stored in at least one of the macroblock hierarchy, the slice information, the slice header, the slice extended information, the picture parameter set and the sequence parameter set.

It is preferable that the IntraBP macroblock mode is not used automatically when the information on whether to use the combined macroblock mode does not exist.

Figure 5:
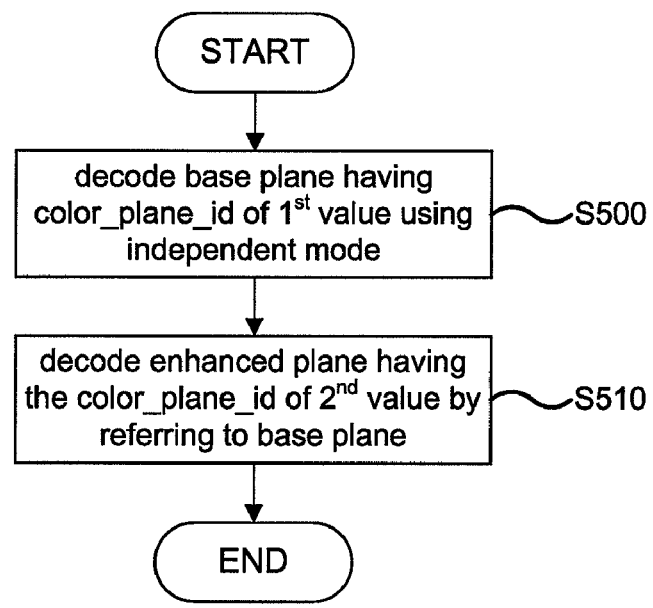
FIG. 5 is a flow diagram illustrating a method for decoding an RGB color space signal in accordance with the present invention.

FIG. 5 is a flow diagram illustrating a method for decoding the RGB color space signal in accordance with the present invention.

As shown in FIG. 5, the method for encoding the RGB color space signal in accordance with the present invention may be applied to the method for decoding the RGB color space signal in accordance with the present invention.

Specifically, the base plane having the color_plane_id of the first value is decoded using the independent mode (S500), and the one or more enhanced plane having the color_plane_id of the second value is decoded by referring to the base plane.

As described above, the method for coding the RGB color space in accordance with the present invention is advantageous in that the base plane is encoded using the independent mode, and the enhanced plane is encoded by referring to the base plane to reduce a redundancy between RGB planes, thereby improving a compression ratio of the image.

What is claimed is:

1. A method for encoding an RGB color space signal, comprising steps of:
   (a) encoding a base plane from the RGB color space signal having a color_plane_id of a first value using an H.264/Advanced Video Coding independent mode profile, wherein the color_plane_id of the first value is configured to indicate base plane encoding; and
   (b) encoding one or more enhanced planes having a color_plane_id of a second value by referring to the base plane, wherein the color_plane_id of the second value is configured to indicate enhanced plane encoding, and wherein the step (b) further comprises:
      (b-1) encoding a current macroblock by referring to a reference macroblock in an intra base plane macroblock mode, wherein the reference macroblock is a macroblock of the base plane;
      (b-2) encoding the current macroblock using an intra prediction mode of the base plane; and
      (b-3) encoding a difference between residual information generated by encoding the current macroblock and residual information generated by encoding the reference macroblock, wherein the residual information generated by encoding the reference macroblock is information generated by encoding the reference macroblock using the intra prediction mode in the base plane, and the residual information generated by encoding the current macroblock is information generated by encoding the current macroblock using a mode identical to the intra prediction mode of the base plane when the current macroblock is a macroblock included in the one or more enhanced plane.

2. The method in accordance with claim 1, wherein the first value is zero and the second value is 1 or higher.

3. The method in accordance with claim 1, wherein encoding the one or more enhanced plane comprises encoding a first enhanced plane and a second enhanced plane, and the step (b) comprises encoding the first enhanced plane by referring to the base plane and encoding the second enhanced plane by referring to the base plane and the first enhanced plane.

4. The method in accordance with claim 1, wherein information on a use of the intra base plane macroblock mode is stored in at least one of a macroblock hierarchy, a slice information, a slice header, a slice extended information, a picture parameter set and a sequence parameter set.

5. The method in accordance with claim 1, further comprising subjecting the residual information generated by encoding the reference macroblock to low pass filtering in a vertical direction, a horizontal direction, or a DC direction.

6. A method for encoding an RGB color space signal, comprising steps of:
   (a) encoding a base plane from the RGB color space signal having a color_plane_id of a first value using an H.264/Advanced Video Coding independent mode profile, wherein the color_plane_id of the first value is configured to indicate base plane encoding; and
   (b) encoding one or more enhanced planes having a color_plane_id of a second value by referring to the base plane, wherein the color_plane_id of the second value is configured to indicate enhanced plane encoding, wherein a reference macroblock is an inter macroblock in an inter base plane macroblock mode, and a current macroblock is encoded using a motion information of the reference macroblock, and wherein the step (b) further comprises:
      (b-1) encoding the current macroblock using a motion information of the base plane; and
      (b-2) encoding a difference between residual information generated by encoding the current macroblock and residual information generated by encoding the reference macroblock.

7. The method in accordance with claim 6, further comprising subjecting the residual information generated by encoding the reference macroblock to a low pass filtering in a vertical direction, a horizontal direction, or a DC direction.

8. A method for encoding an RGB color space signal, comprising steps of:
   (a) encoding a base plane from the RGB color space signal having a color_plane_id of a first value using an H.264/Advanced Video Coding independent mode profile, wherein the color_plane_id of the first value is configured to indicate base plane encoding; and
   (b) encoding one or more enhanced planes having a color_plane_id of a second value by referring to the base plane, wherein the color_plane_id of the second value is configured to indicate enhanced plane encoding, wherein a reference macroblock is an inter macroblock in an inter base plane macroblock mode, and a current macroblock is encoded using a reference index of the reference macroblock and using a motion vector as a prediction value, and wherein information on a use of the inter base plane macroblock mode is stored in at least one of a macroblock hierarchy, a slice information, a slice header, a slice extended information, a picture parameter set and a sequence parameter set.

9. A method for encoding an RGB color space signal, comprising steps of:
(a) encoding a base plane from the RGB color space signal having a color_plane_id of a first value using an H.264/Advanced Video Coding independent mode profile, wherein the color_plane_id of the first value is configured to indicate base plane encoding;
(b) encoding one or more enhanced planes having a color_plane_id of a second value by referring to the base plane, wherein the color_plane_id of the second value is configured to indicate enhanced plane encoding; and
(c) carrying out a filtering having a constant intensity for deblocking.

* * * * *